(12) United States Patent
Jablonski et al.

(10) Patent No.: US 11,585,229 B2
(45) Date of Patent: Feb. 21, 2023

(54) BLADED DISK FLEXIBLE IN THE LOWER PART OF THE BLADES

(71) Applicant: SAFRAN AIRCRAFT ENGINES, Paris (FR)

(72) Inventors: Laurent Jablonski, Moissy-Cramayel (FR); François Jean Comin, Moissy-Cramayel (FR); Philippe Gérard Edmond Joly, Moissy-Cramayel (FR); Jean-Marc Claude Perrollaz, Moissy-Cramayel (FR); Anthony Lafitte, Moissy-Cramayel (FR); Rémi Roland Robert Mercier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 144 days.

(21) Appl. No.: 16/982,171

(22) PCT Filed: Mar. 19, 2019

(86) PCT No.: PCT/FR2019/050616
§ 371 (c)(1),
(2) Date: Sep. 18, 2020

(87) PCT Pub. No.: WO2019/180366
PCT Pub. Date: Sep. 26, 2019

(65) Prior Publication Data
US 2021/0025283 A1    Jan. 28, 2021

(30) Foreign Application Priority Data
Mar. 19, 2018    (FR) ........................................ 1852337

(51) Int. Cl.
*F01D 11/00*    (2006.01)
*F01D 5/34*    (2006.01)
*F04D 29/32*    (2006.01)

(52) U.S. Cl.
CPC .............. *F01D 11/003* (2013.01); *F01D 5/34* (2013.01); *F01D 11/005* (2013.01);
(Continued)

(58) Field of Classification Search
CPC .... F01D 11/003; F01D 11/005; F01D 11/006; F01D 5/34; F04D 29/321; F04D 29/322;
(Continued)

(56) References Cited

U.S. PATENT DOCUMENTS 5,277,548 A * 1/1994 Klein .................... F01D 11/008
416/193 A
7,780,419 B1 * 8/2010 Matheny ............... F04D 29/324
416/224

(Continued)

FOREIGN PATENT DOCUMENTS

CN    104314619 B    2/2016
WO    2015/130381 A2    9/2015
WO    WO-2016139416 A1 *    9/2016 ............... F01D 5/34

OTHER PUBLICATIONS

International Search Report dated May 23, 2019 in International Application No. PCT/FR2019/050616.
(Continued)

*Primary Examiner* — Kenneth Bomberg
*Assistant Examiner* — Adam W Brown
(74) *Attorney, Agent, or Firm* — Sughrue Mion, PLLC

(57) ABSTRACT

The invention relates to a bladed disk (1) of a fan, comprising: a hub (10) comprising an outer radial platform (13) designed so as to define an inner gas flow stream in the turbomachine, a plurality of blades (20) comprising a root
(Continued)

(23) connected to the platform (13), a leading edge (21) and a trailing edge (22), a groove formed in the platform (13) around part of the root (23) of each blade (20) in an area adjacent to the leading edge (21) and/or the trailing edge (22), and a joint (30) placed in the groove (15) in such a way that it extends in the extension of the radially outer face (14) of the platform (13) in order to ensure a continuity of the inner flow stream.

15 Claims, 3 Drawing Sheets

(52) U.S. Cl.
CPC .......... *F01D 11/006* (2013.01); *F04D 29/325* (2013.01); *F05D 2220/30* (2013.01); *F05D 2240/55* (2013.01)

(58) Field of Classification Search
CPC . F04D 29/324; F05D 2220/30; F05D 2240/55
See application file for complete search history.

(56) References Cited

U.S. PATENT DOCUMENTS

| | | | |
|---|---|---|---|
| 9,765,637 B2* | 9/2017 | Merlot | F01D 5/12 |
| 9,863,252 B2* | 1/2018 | Merlot | F01D 5/141 |
| 10,619,495 B2* | 4/2020 | Joly | F01D 5/34 |
| 2006/0099078 A1 | 5/2006 | Rice et al. | |
| 2011/0064580 A1 | 3/2011 | Barnes et al. | |
| 2014/0205441 A1 | 7/2014 | Lee | |
| 2015/0267545 A1* | 9/2015 | Merlot | F01D 5/3038 |
| | | | 416/193 A |
| 2016/0138403 A1* | 5/2016 | Merlot | F04D 29/329 |
| | | | 416/223 A |

OTHER PUBLICATIONS

Written Opinion of the International Searching Authority dated May 23, 2019 in International Application No. PCT/FR2019/050616.
Search Report dated Dec. 7, 2018 in French Application No. 1852337.

* cited by examiner

BLADED DISK FLEXIBLE IN THE LOWER PART OF THE BLADES

CROSS REFERENCE TO RELATED APPLICATIONS

This application is a National Stage of International Application No. PCT/FR2019/050616 filed Mar. 19, 2019, claiming priority based on French Patent Application No. 1852337 filed Mar. 19, 2018, the entire contents of each of which are herein incorporated by reference in their entireties.

FIELD OF THE INVENTION

The invention relates generally to the gas turbine engines, and more particularly to a fan disk of such as turbojet engine, this disk being of the blisk type, that is to say it includes a hub and blades forming a non-detachable single part.

TECHNOLOGICAL BACKGROUND

A bypass turbomachine generally comprises, from upstream to downstream in the flow direction of the gases, a fan, an annular primary flow space and an annular secondary flow space. The mass of air sucked by the fan is therefore divided into a primary stream and a secondary stream which is concentric with the primary stream.

The primary stream passes through a primary body comprising one or several compressor stage(s), for example a low-pressure compressor and a high-pressure compressor, a combustion chamber, one or several turbine stage(s), for example a high-pressure turbine and a low-pressure turbine, and a gas exhaust nozzle.

In a manner known per se, the blades of the fan are fixed onto a disk, called fan disk, which is driven by the turbine stages via a drive shaft. The fan blades can be added and fixed onto the fan disk. Alternatively, the fan blades can be formed integrally and in one piece with a hub by forming therewith a single and non-detachable part called blisk. The hub of this blisk is connected to the fan blades at their root.

In the case of a blisk, the ingestion of a foreign body gives rise to a concentration of mechanical stresses which is maximum at the base of the impacted blades, that is to say at the junction of each of these blades with the hub. This situation is due to the fact that the one-piece structure gives rise to greater rigidity of the blades at their connection with the hub. In case of ingestion of a foreign body in the turbomachine, the impacted blades are highly stressed in bending, which tends to further increase the mechanical stress at the base of the blades and may remove them from the hub.

It has therefore been proposed, in document FR 3 028 574 in the name of the Applicant, a blisk of a fan in which the airfoil is arranged to protrude, on the upstream side, from its leading edge and/or, on the downstream side, from its trailing edge. Such a configuration allows obtaining a gain in suppleness and in flexibility of the blades and improving their impact strength significantly.

SUMMARY OF THE INVENTION

An objective of the invention is to propose another solution for reducing the level of stress in the airfoil base, particularly in case of ingestion of a foreign body.

For this, the invention proposes a blisk of a stage of a turbomachine, in particular a fan, comprising:

a hub comprising an upstream edge, a downstream edge and a radial platform extending between the upstream edge and the downstream edge and configured to define via a radially outer face an inner flowpath of a gas in the turbomachine, and a plurality of blades, said blades extending radially from the platform and being formed integrally and in one piece with said platform, each blade comprising a root connected to the platform, a leading edge and a trailing edge.

A groove is also formed in the platform around part of the root of each blade in an area adjacent to the leading edge and/or to the trailing edge. In addition, the blisk further comprises a seal placed in the groove so as to extend in the extension of the radially outer face of the platform in order to ensure a continuity of the inner flowpath, and in that said groove opens out onto the nearest edge of the platform among the upstream edge or the downstream edge.

Some preferred but non-limiting characteristics of the blisk described above are the following, taken individually or in combination:

the seal also ensures a sealing function with a stage downstream of the turbomachine.

the platform further has a radially inner face opposite the radially outer face and the grooves opening out into the radially inner face, and in which the seal comprises an annular shroud configured to bear against the radially inner face of the platform and a plurality of protrusions configured to be housed each in an associated groove.

the groove is a through groove.

the seal forms a radius of connection of the root of the blade.

the groove extends around the trailing edge of the corresponding blade.

the groove extends along the associated blade over a distance comprised between 5% and 20% of a chord of the associated blade.

a stiffness of the seal is lower than a stiffness of the platform.

the stiffness of the seal is at most equal to 50% of the stiffness of the platform.

According to a second aspect, the invention also proposes a fan comprising a blisk as described above.

BRIEF DESCRIPTION OF THE DRAWINGS

Other characteristics, aims and advantages of the present invention will become more apparent upon reading the following detailed description, and in relation to the appended drawings given by way of non-limiting examples and in which.

DETAILED DESCRIPTION OF ONE EMBODIMENT

Figure 1:
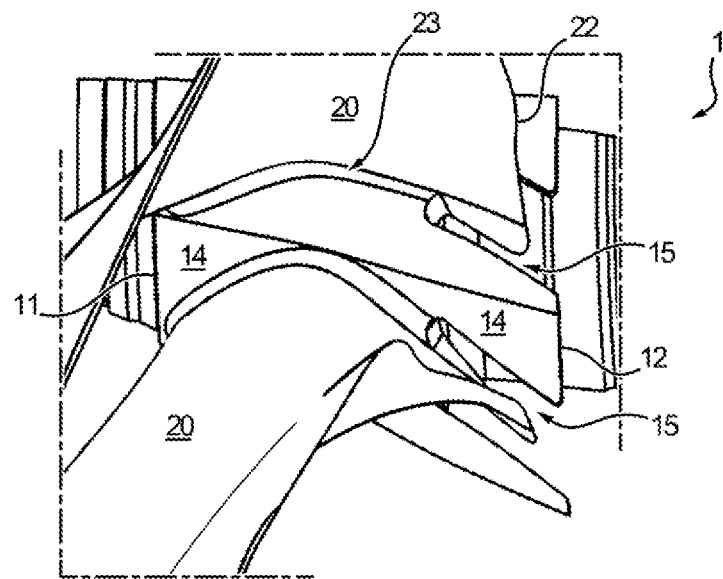
FIG. 1 is a top view of a sector of a first exemplary embodiment of a blisk according to the invention, in which the seal has been omitted.
Figure 2:
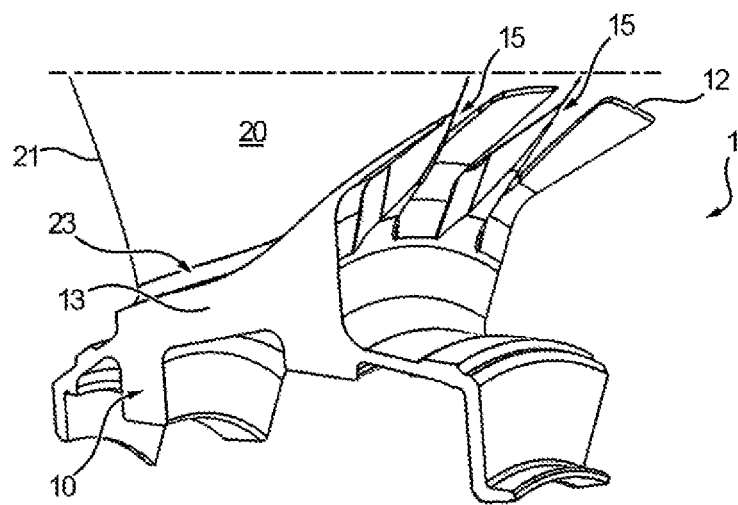
FIG. 2 is a side view of the sector of FIG. 1, in which the seal has been omitted.
Figure 3:
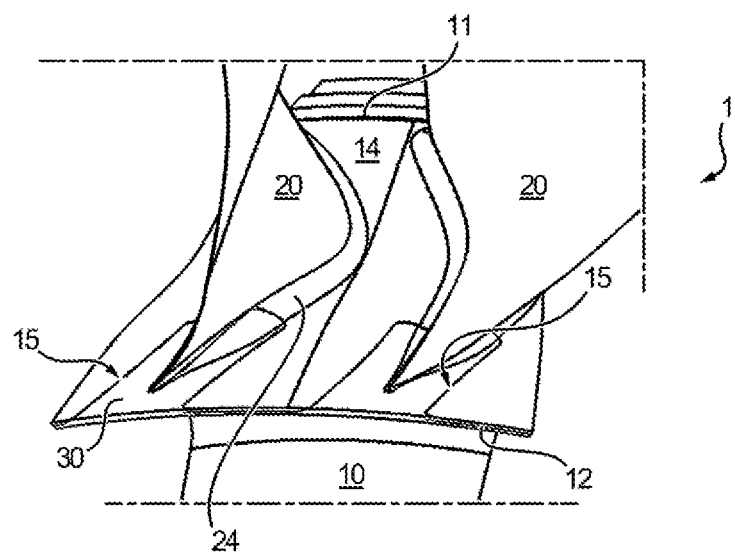
FIG. 3 is a rear view of the sector of FIG. 1, in which the seal has been represented.
Figure 4:
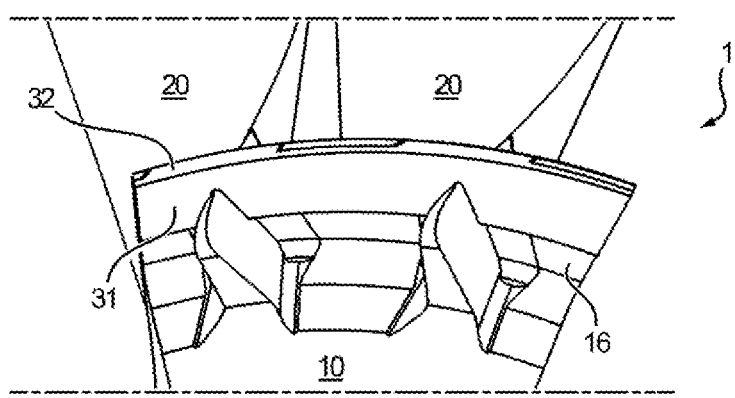
FIG. 4 is a bottom view of the sector of FIG. 1, in which the seal has been represented.

A sector of a blisk 1 according to one embodiment has been partially represented in the appended figures. Such a blisk 1 can be used in any rotating or stationary part of a turbomachine, and more particularly for the rotating part of a fan.

The disk 1 comprises a hub 10 comprising an upstream edge 11, a downstream edge 12 and an outer radial platform 13 extending between the upstream edge 11 and the downstream edge 12. The radially outer face 14 of the platform 13 is configured to define the inner flowpath of the gas flow in the turbomachine.

The disk 1 further comprises a plurality of blades 20 extending radially from the platform 13. Each blade 20 is formed integrally and in one piece with the platform 13 and comprises a root 23 connected to the platform 13, a leading edge 21 and a trailing edge 22. The root is here a base of connection of the blade to the platform 13 and to the hub 10.

By leading edge 21 it will be understood here the edge of the blade 20 which is disposed facing the gas flow in the turbomachine. The trailing edge 22 is opposite to the leading edge 21. Finally, each blade 20 has a chord, which is defined as a fictitious segment connecting the leading edge 21 and the trailing edge 22 at the root 23 of the blade 20.

In order to soften the disk 1, a groove 15 is formed in the platform 13 around part of the root 23 of each blade 20 in an area adjacent to the leading edge 21 and/or to the trailing edge 22 of the blade 20. Furthermore, a seal 30 is placed in the groove 15 so that it extends in the extension of the rest of the platform 13 and thus ensures a continuity of the flowpath. In other words, thanks to the seal 30 housed in the groove 15, the radially outer face 14 of the platform 13 seen by the gas flow is substantially smooth and similar to the radially outer face 14 of a conventional platform 13, thus limiting the head losses.

The choice of the location of the groove 15 around the root 23 of the blade 20 depends on the ideal location of tearing or removal of the blade 20 in case of ingestion. Typically, when the ideal location of tearing is at the blade 20 root 23 on the side of its trailing edge 22, the groove 15 is formed around the trailing edge 22. Alternatively, when the ideal location of tearing is at its leading edge 21, the groove 15 is formed around the leading edge 21.

The groove 15 may be a through groove, that is to say it may open out both into the radially outer face 14 and the radially inner face 16 of the platform 13. Alternatively, the groove 15 may only open out into the radially outer face 14 of the platform 13 or into the radially inner face 16 of the platform 13 and have a bottom.

In the examples illustrated in the figures, the groove 15 is for example a through groove.

The platform 13 can comprise as many seals 30 as there are grooves 15, so that a seal 30 is housed in each groove 15. Alternatively, the same seal 30 can be housed in several grooves 15. In this case, the grooves 15 open out into the radially inner face 16 of the platform 13 and the seal 30 comprises an annular shroud 31, configured to bear against the radially inner face 16 of the platform 13 and of the protrusions 32 configured to be housed each in an associated groove 15. The annular shroud 31 can be a one-piece or a sectorized shroud.

The seal 30 is chosen so as to have a lower stiffness than that of the platform 13 and thus allow the displacement of the disk 1 around the blades 20 during ingestion, which reduces the level of stresses at the base of the blades. 20. For example, the stiffness of the seal 30 is at most equal to 50% of the stiffness of the platform 13. The seal may for example be made of elastomer, polyurethane or any other material that can both be flexible and able to resist the centrifugal effects.

By stiffness of a given body, it will be understood here the characteristic indicating the resistance to elastic deformation of the body. The stiffer a part, the more it is necessary to apply a significant force thereto to obtain a given deflection.

In one embodiment, the groove 15 opens out onto the nearest edge of the platform 13 among the upstream edge 11 or the downstream edge 12 of the platform 13. Thus, when the groove 15 is formed around the trailing edge 22, it opens out onto the downstream edge 12 of the platform 13. In the exemplary embodiment in which the groove is a through groove, said groove 15 therefore constitutes a notch in this downstream edge 12. Alternatively, when the groove 15 is formed around the leading edge 21, it opens out onto the upstream edge 11 of the platform 13. In the exemplary embodiment in which the groove is a through groove, said groove 15 therefore constitutes a notch in this upstream edge 11.

Such an embodiment allows further increasing the flexibility and the suppleness of the blisk 1.

In the example of a notched groove as represented, this groove 15 extends by being directly delimited by the base of connection of the blade 20. In other words, the seal 30 comprises the material forming the radius of connection 24 of the blade 20 to the platform 13. Considering the material common to the hub 10 and to the blade 20 of the disk, the platform 13 is therefore at a distance from the root of the blade 20 and is separated therefrom by the seal 30. There is therefore here no platform strip immediately adjacent other than by the material of the seal. Such an embodiment gives increased suppleness to the disk thanks to the absence of a rigid platform.

The groove 15 can for example be made by trimming.

In one embodiment, the groove 15 extends along the associated blade 20 over a distance comprised between 5% and 20% of the chord of said blade 20, in order to obtain the flexibility and the suppleness necessary to limit the risks of damage to the disk 1 in case of ingestion, while ensuring sufficient strength of the disk 1 in normal operation.

It should be noted that the seal 30 can also ensure a sealing function with the immediately downstream stage. Typically, in the case of a blisk 1 of a fan, the seal 30 allows ensuring a sealing with the immediately downstream low-pressure compressor stage (or booster).

Figure 5:
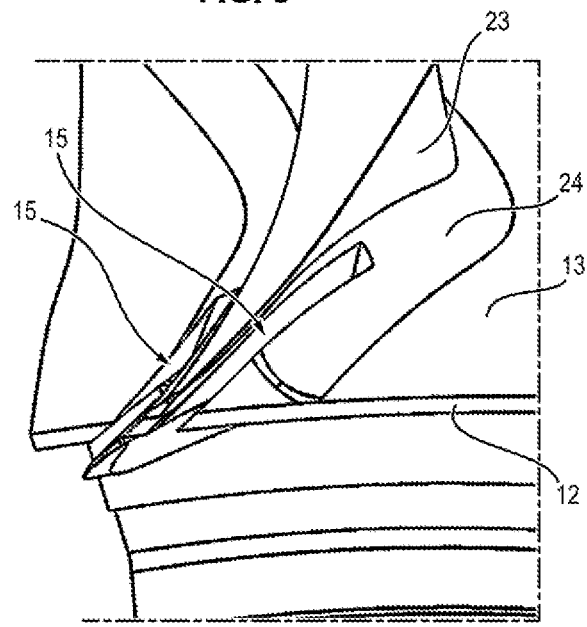
FIG. 5 is a view from the downstream edge of a second exemplary embodiment of a blisk sector according to the invention, in which the seal has been omitted.
Figure 6:
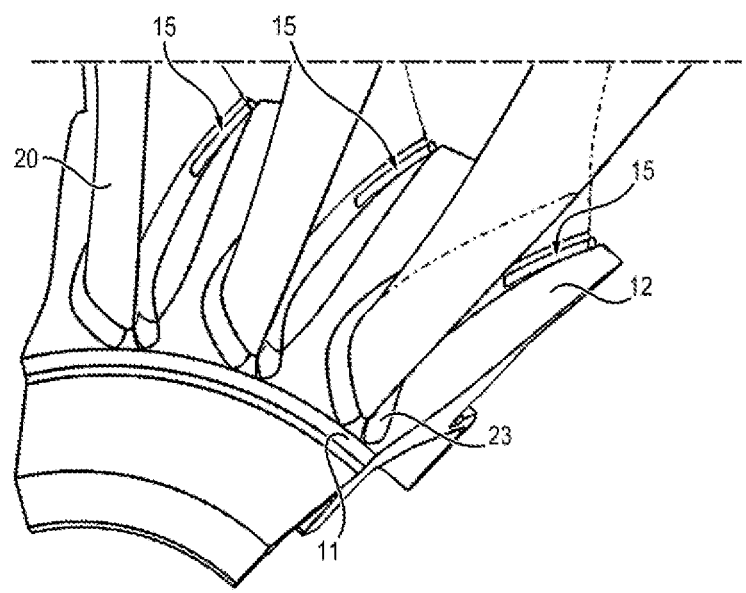
FIG. 6 is a view from the upstream edge of the blisk of FIG. 5.

In an alternative embodiment illustrated in FIGS. 5 and 6, a groove 15 can be made on either side of each blade root 20, preferably at the radius of connection of the blade 20. The grooves then extend substantially parallel to the intrados and to the extrados of the blade 20 in question and opens out onto the downstream edge 12 or the upstream edge 11 of the platform 13 (depending on whether the grooves 15 are made at the leading edge 21 or the trailing edge 22 of the blade 20, respectively). A seal 30 is also housed in each groove 15. The grooves may be through grooves, as illustrated in the figures, or non-through grooves.

To make such grooves 15, it is in particular possible to machine the blisk 1 and the blade roots 23 with the grooves 15, to carry out inertial welding of the pre-machined blades 20 (so that at least one section of the blades 20 is not integrally formed in the same machined piece as the disk 1), then to perform a finishing machining of the assembly. The placement of the seals 30 to close the grooves 15 allows avoiding the loss of performance related to the air recirculation caused by the grooves 15.

The invention claimed is:

1. A blisk of a turbomachine, the blisk comprising:
   a hub comprising a platform, the platform having an upstream edge, a downstream edge and a radially outer face configured to define an inner flowpath of a gas in the turbomachine,
   a plurality of blades, said blades extending radially from the platform and being formed integrally and in one piece with said platform, each blade comprising a root connected to the platform, a leading edge and a trailing edge, wherein a downstream edge of the platform is downstream of the trailing edge of the blades,
   a groove formed in at least one of the following portions of the platforms: in an area of the platform that surrounds the leading edge of a blade, in an area of the platform that surrounds the trailing edge of a blade, wherein the groove opens out onto a nearest edge of the platform among the upstream edge and the downstream edge, and
   a seal placed in the groove to form an extension of the radially outer face of the platform and ensure a continuity of the inner flowpath.

2. The blisk of claim 1, wherein the seal is configured to form a seal between the blisk and a stage downstream of the blisk.

3. The blisk of claim 1, wherein the platform has a radially inner face opposite the radially outer face and the groove opens out into the radially inner face, and wherein the seal comprises an annular shroud configured to bear against the radially inner face of the platform and a protrusion configured to be housed in the groove.

4. The blisk of claim 1, wherein the groove is a through groove.

5. The blisk of claim 4, wherein the seal defines a radius of connection of the root of the blade.

6. The blisk of claim 1, wherein the groove surrounds the trailing edge of the blade.

7. The blisk of claim 1, wherein the groove extends along the blade over a distance comprised between 5% and 20% of a chord of the blade.

8. The blisk of claim 1, wherein a stiffness of the seal is less than a stiffness of the platform.

9. The blisk of claim 8, wherein the stiffness of the seal is at most equal to 50% of the stiffness of the platform.

10. A blisk of a turbomachine, the blisk comprising:
    a hub comprising a platform, the platform having an upstream edge, a downstream edge and a radially outer face configured to define an inner flowpath of a gas in the turbomachine,
    a plurality of blades, said blades extending radially from the platform and being formed integrally and in one piece with said platform, each blade comprising a root connected to the platform, a leading edge and a trailing edge,
    a groove formed in at least one of the following portions of the platforms: in an area of the platform that surrounds the leading edge of a blade, in an area of the platform that surrounds the trailing edge of a blade, wherein the groove opens out onto a nearest edge of the platform among the upstream edge and the downstream edge, and
    a seal placed in the groove to form an extension of the radially outer face of the platform and ensure a continuity of the inner flowpath, wherein the seal defines a radius of connection of a root of the blade.

11. The blisk of claim 10, further comprising additional grooves and additional seals,
    wherein each groove is formed in at least one of the following portions of the platforms: in an area of the platform that surrounds the leading edge of a corresponding blade, in an area of the platform that surrounds the trailing edge of the corresponding blade, wherein the groove opens out onto a nearest edge of the platform among the upstream edge and the downstream edge, and
    wherein each additional seal is placed in a corresponding groove of the additional grooves to form an extension of the radially outer face of the platform and ensure a continuity of the inner flowpath, wherein each of the additional seals defines a radius of connection of a root of the corresponding blade.

12. The blisk of claim 10, wherein the groove is a through groove.

13. An assembly comprising:
    the blisk of claim 10; and
    a stage of a low-pressure compressor that extends immediately downstream of the blisk.

14. The blisk of claim 1, further comprising additional grooves and additional seals,
    wherein each groove is formed in at least one of the following portions of the platforms: in an area of the platform that surrounds the leading edge of a corresponding blade, in an area of the platform that surrounds the trailing edge of the corresponding blade, wherein the groove opens out onto a nearest edge of the platform among the upstream edge and the downstream edge, and
    wherein each additional seal is placed in a corresponding groove of the additional grooves to form an extension of the radially outer face of the platform and ensure a continuity of the inner flowpath.

15. An assembly comprising:
    the blisk of claim 1; and
    a stage of a low-pressure compressor that extends immediately downstream of the blisk.

* * * * *